United States Patent [19]

Crain

[11] Patent Number: 5,412,898
[45] Date of Patent: May 9, 1995

[54] WIND DRIVEN FISH BAIT BOBBER AND FISHING REEL

[76] Inventor: Emmett W. Crain, 214 Tighe St., Calion, Ark. 71724

[21] Appl. No.: 179,372

[22] Filed: Jan. 10, 1994

[51] Int. Cl.⁶ .............................................. A01K 97/12
[52] U.S. Cl. ................................................... 43/19.2
[58] Field of Search ............................... 43/19.2, 26.1

[56] References Cited

U.S. PATENT DOCUMENTS

| | | | |
|---|---|---|---|
| 2,122,836 | 7/1938 | Gegerfeldt | 43/4 |
| 2,643,478 | 6/1953 | Paulsen | 43/19.2 |
| 3,599,369 | 8/1971 | Carlson | 43/17 |
| 4,033,062 | 7/1977 | Denecky | 43/15 |
| 4,077,149 | 3/1978 | Enquist | 43/19.2 |
| 4,373,287 | 2/1983 | Grahl | 43/19.2 |
| 4,567,686 | 2/1986 | Akom | 43/19.2 |
| 4,890,409 | 1/1990 | Morgan | 43/19.2 |
| 5,231,784 | 8/1993 | Condusta | 43/19.2 |

*Primary Examiner*—Kurt Rowan
*Attorney, Agent, or Firm*—Brady, O'Boyle & Gates

[57] ABSTRACT

A support frame is hung over water to be fished in a vertically depending position with an automatic, spring loaded, trigger release fishing reel attached to the top of the frame with the fishing line extending off the reel into operative contact with the trigger release and downwardly through guide eyelets on the support frame and in spaced relation to the support frame, and beneath the water with a fish hook on the free end of the fishing line. A wind motor is connected for free rotation on an axle extending from a medial portion of the support frame and has a pin extending from the rotor thereof which contacts the fishing line on each rotation of the wind motor, and moves it laterally to impart a vertical reciprocating jigging or bobbing motion to the fishing line and the hook on the end of the line to attract a fish. A wind vane connected to the support frame keeps the wind motor directed toward the wind. A fish tugging on the hook operates the trigger release causing the fishing reel to automatically reel in the fish.

12 Claims, 2 Drawing Sheets

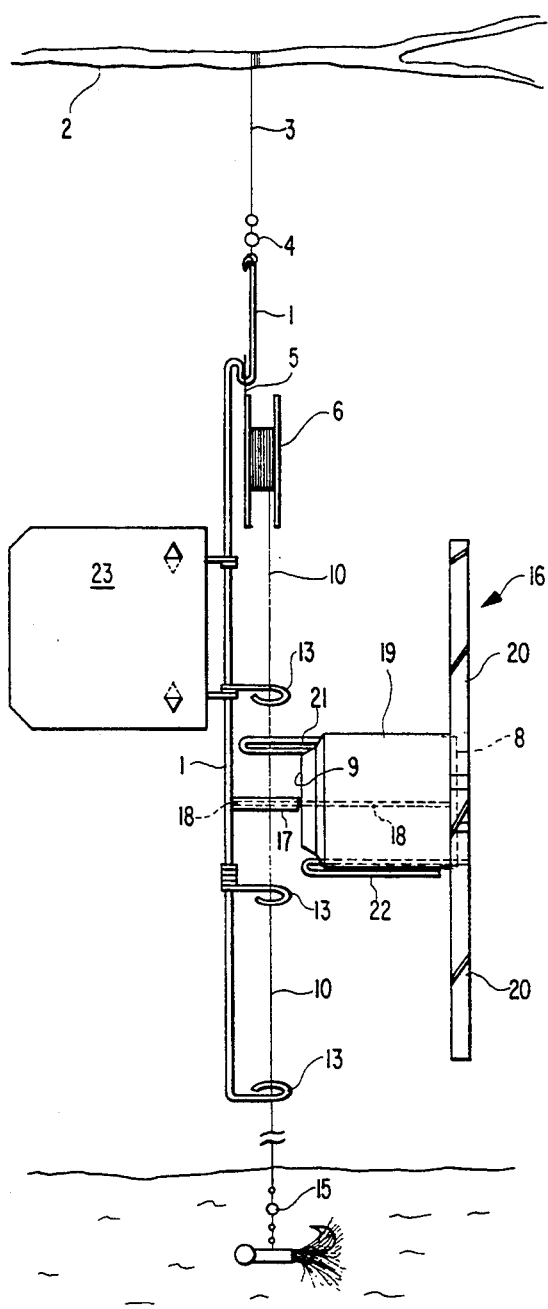
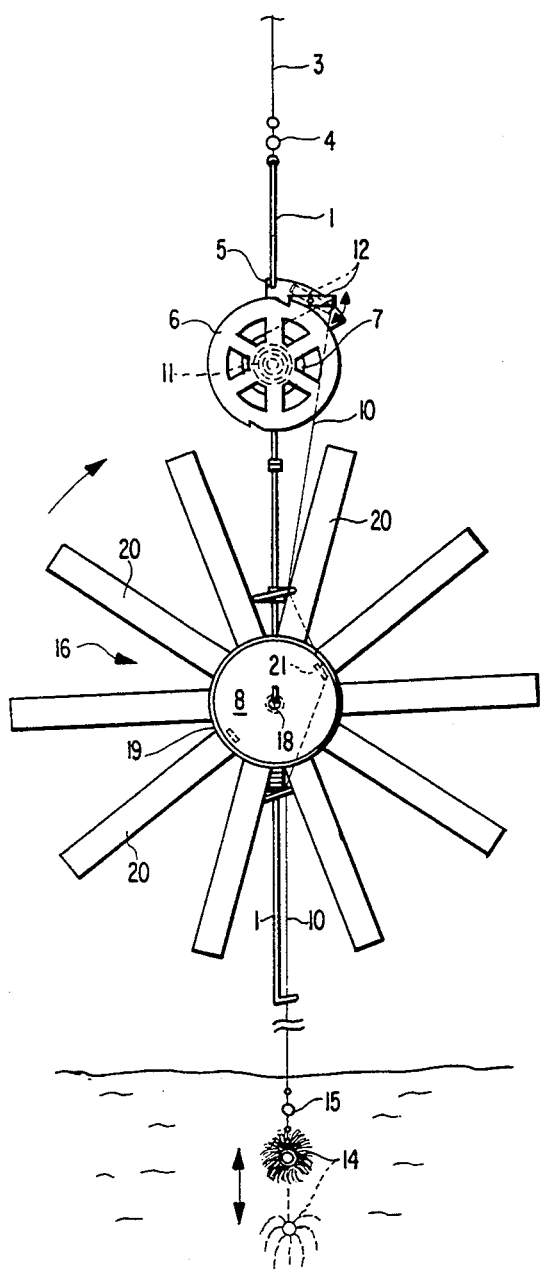
FIG. 1
FIG. 2

WIND DRIVEN FISH BAIT BOBBER AND FISHING REEL

BACKGROUND OF THE INVENTION

Wind driven fish bait bobbers have been proposed wherein a vertically extending fishing line having a baited hook on the lower end thereof is operatively connected to a wind driven motor, so that as the motor rotates, a reciprocating jigging motion is imparted to the line to thereby lure fish to the baited hook.

U.S. Pat. No. 3,599,369, dated Aug. 17, 1971, discloses a type of wind driven fish bait bobber which has been satisfactory for its intended purpose; however, characterized by its number of moving parts and complexity, and its limited mounting capabilities.

After considerable research and experimentation, the wind driven fish bait bobber of the present invention has been devised to have fewer moving parts, therefore not likely to get out of order even after long and continued use, and which is versatile in its easy mounting for use in a variety of fishing situations.

SUMMARY OF THE INVENTION

The wind driven fish bait bobber and fishing reel of the present invention comprises, essentially, a vertically extending support wire adapted to be freely suspended from a support, such as a tree limb or pole member positioned over a body of water. An automatic fishing reel is mounted on the support wire in proximity to the upper end portion thereof, and a fishing line extends downwardly from the fishing reel through eyelets provided on the support wire, and a lure or baited hook is fastened to the free end of the fishing line and extends into the water.

A wind driven motor having a rotor is mounted on the support wire and is spaced outwardly therefrom. A pin is carried on the rotor of the motor and extends in proximity to the fishing line so that during the rotation of the rotor the pin engages and laterally deflects the fishing line, on each revolution of the wind driven rotor, to thereby impart a vertical reciprocating jigging motion to the line and associated lure beneath the water. A vane is connected to the support wire to maintain the wind driven motor in a direction facing the wind, and the fishing reel is of the type which automatically winds the fishing line onto the reel when a fish has been hooked.

BRIEF DESCRIPTION OF THE DRAWINGS

FIG. 1 is a side elevational view of the wind driven fish bait bobber and automatic fishing reel of the present invention;

FIG. 2 is a front elevational view of the assembly shown in FIG. 1; and

DESCRIPTION OF THE PREFERRED EMBODIMENT

Figure 3:
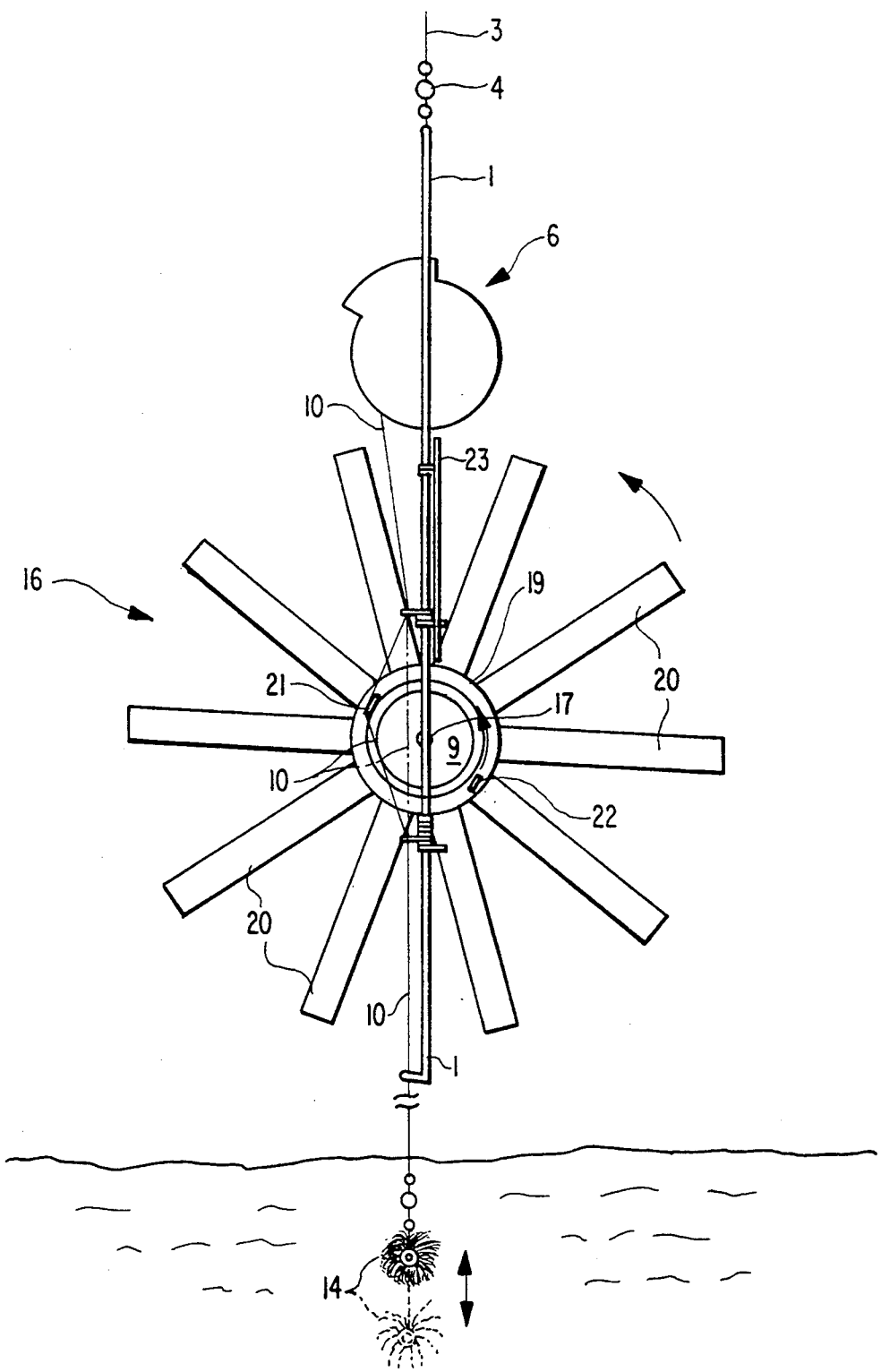
FIG. 3 is a rear elevational view of the assembly shown in FIG. 2.

Referring to the drawings in greater detail, and more particularly to FIGS. 1 and 2, the wind driven fish bait bobber and fishing reel of the present invention comprises, a vertically extending support wire 1 suspended from a support 2, such as a tree limb or pole member extending out over water, such as a stream, river, lake, or the like, by means of a rope or string 3, having a swivel 4. The wire 1 is bent as at 5 to provide a notch or hook portion from which a fishing reel 6 is suspended.

The fishing reel 6 is an automatic type fishing reel, of a well-known type, such as manufactured by the Mechanical Fisher Corp. of Little Rock, Ark., and includes a rotary drum 7 upon which a fishing line 10 is wound. A wind-up torsion spring 11 is operatively connected to the drum 7 biasing the drum in a direction to wind the fishing line 10 thereon. A suitable, pivoted latch or trigger 12 is provided for releasably holding the drum 7 in the wind-up mode by one end of the pivoted latch engaging a notch in the reel body. The fishing line 10 extends outwardly from the drum 7 and is engaged over the opposite end of the latch 12. From the latch 12, the line 10 extends downwardly through suitable guide eyelets 13 secured to and spaced along the support wire 1, and a lure or baited hook 14 is secured to the lower end of the fishing line 10 by a swivel connection 15.

In order to impart a bobbing or vertical reciprocating jigging action to the line 10, and thus the lure or hook 14 beneath the water, a wind motor 16 is mounted on a medial portion of the support wire 1. An axle 18, integrally secured to the support wire 1, extends transversely therefrom at right angles. The wind motor 16 comprises a light weight hollow, cylindrical rotor 19 having opposite end walls 8 and 9 freely rotatably journaled on axle 18. A spacer tube 17 fits over axle 18 between end wall 9 and support wire 1 to maintain rotor 19 in spaced relation to the support wire 1. A plurality of paddles or fan blades 20 are fixedly secured to the rotor 19 and extend radially outwardly therefrom. A pin 21 is secured to the rear of rotor 19 and extends in a direction toward the support wire 1 in proximity to the fishing line 10, as it extends between a pair of guide eyelets 13, and a counterweight 22 is mounted on the rotor 19 diametrically opposite the pin 21 to thereby balance the wind motor.

By this construction and arrangement, when the wind motor 16 is driven by a breeze impacting upon fan blades 20, the pin 21 on each revolution of rotor 19, engages the normally generally vertical fishing line 10, that is in proximity to axle 18, and moves it laterally outwardly approximately by the distance of pin 21 from axle 18, and then moves it back to the normally vertical position. This lateral movement thereby imparts an up and down reciprocatory or bobbing action to the line 10 and the lure 14, as indicated by the arrows in FIGS. 2 and 3.

To complete the structural description of the bobber, a vane 23 is secured to the support wire 1, on the opposite side from the wind motor to counterbalance the same, and to maintain the wind driven motor 16 in a direction facing the wind or breeze.

In use, the support wire 1 and associated automatic fishing reel 6, and wind motor 16 are suspended from a suitable support 2. The fishing line 10 is pulled from the reel drum 7, which winds up the torsion spring 11, and is fed through one end of the pivoted latch 12 and eyelets 13, and a suitable lure or baited hook 14 is connected to the free end of the fishing line 10 positioned beneath the water. The opposite end of the pivoted latch is engaged in a stop notch on a portion of the reel connected with the drum 7 to maintain the reel in its spring loaded state. As the wind motor 16 is driven, a vertical reciprocating jigging or bobbing motion is imparted to the lure 14, as described hereinabove. When a fish grabs the hook 14 and is caught, a tension is imparted to the fishing line 10 causing the line to pivot latch 12 to release the latch 12 from its holding position so that the line 10 is automatically wound onto the drum 7 by the biasing action of the torsion spring 17, thus setting the hook in the mouth of the fish and reeling in the fish. After the fish is removed from the hook, when the bobber is removed for storage, when the line 10 is wound up, the lure 14 will engage the lowest eyelet 13 on the support wire 1 to prevent the fishing line from becoming fully wound onto the reel 6.

The terms and expressions which have been employed herein are used as terms of description and not of limitation, and there is no intention, in the use of such terms and expressions, of excluding any equivalents of the features shown and described or portions thereof, but it is recognized that various modifications are possible within the scope of the invention claimed.

I claim:

1. A wind driven fish bait bobber and fishing reel comprising, a vertical support means having a top portion and being vertically disposed in the use position, means for suspending said vertical support means from the top portion thereof vertically over a body of water, a fishing reel mounted on said vertical support means, a fishing line extending substantially vertically downwardly from the fishing reel into said body of water, a fish hook connected to the free end of said fishing line, a wind driven rotary motor having a rotor mounted for rotation on said vertical support means in substantially vertical alignment with said fishing reel, a pin carried on said rotor and extending in proximity to said vertically downwardly extending fishing line, whereby upon rotation of the rotor the pin engages and deflects the vertically extending fishing line, to thereby impart a reciprocating jigging motion to the fishing line and associated hook.

2. A wind driven fish bait bobber and fishing reel according to claim 1, wherein a vane is connected to the support means for maintaining the wind driven motor in a direction facing the wind.

3. A wind driven fish bait bobber and fishing reel according to claim 1, wherein the fishing reel is automatic and comprises a rotary drum, said fishing line being wound on said drum, a torsion spring operatively connected to said drum for biasing said drum in a direction to wind said fishing line thereon, and a releasable latch operatively connected to said drum for holding the drum against the biasing force of said spring, said fishing line extending into contact with said latch, whereby a fish grabbing the hook imparts a tension force to the fishing line, to thereby release the latch so that the fishing line is automatically wound on to the drum by the biasing force of the torsion spring to catch the fish.

4. A wind driven fish bait bobber and fishing reel according to claim 1, wherein the means for suspending said support means comprises a tree limb, and a line connected between said tree limb and said support means.

5. A wind driven fish bait bobber and fishing reel according to claim 1, in which said wind driven rotary motor is mounted on said support means below said fishing reel.

6. A wind driven fish bait bobber and fishing reel according to claim 2, including a plurality of spaced guide means connected along said support means, said fishing line extending through said guide means, said support means comprising a vertically disposed support member in the use position, and said fishing reel, said vane, said rotor, and said guide means being connected along the length of said vertically disposed support member in substantial vertical alignment.

7. A wind driven fish bait bobber and fishing reel according to claim 1, including an axle integral with said vertical support means and extending at substantially right angles thereto, and said rotor mounted for rotation on said axle.

8. A wind driven fish bait bobber and fishing reel according to claim 7, including spacer means on said axle between said support means and said rotor to maintain them in spaced relation, said fishing line extending adjacent said axle, and said pin extending from said rotor toward said support means in the space therebetween provided by said spacer means.

9. A wind driven fish bait bobber and fishing reel according to claim 1, a plurality of spaced guide means connected along said support means, said fishing line extending through said guide means, one of said guide means spaced above said rotor and another of said guide means spaced below said rotor, whereby said pin carried on said rotor is positioned between said one end of said another guide means.

10. A wind driven fish bait bobber and fishing reel comprising, a vertically extending wire support member, means for suspending said wire support member over a body of water, a fishing reel mounted on said support member, a plurality of spaced guide means connected to said wire support member, a fishing line extending downwardly from the fishing reel through said guide means into said body of water, a fish hook connected to the free end of said fishing line, a wind driven rotary motor having a rotor mounted for rotation on said support member, a pin carried on said rotor and extending in proximity to said fishing line, whereby upon rotation of the rotor the pin engages and deflects the fishing line, to thereby impart a reciprocating jigging motion to the fishing line and associated hook.

11. A wind driven fish bait bobber and fishing reel according to claim 10, wherein the wire member is bent to form a hook portion, said fishing reel being suspended from said hook portion.

12. A wind driven fish bait bobber and fishing reel according to claim 10, in which said pin engages said fishing line between a pair of said spaced guide means.

* * * * *